2,667,913

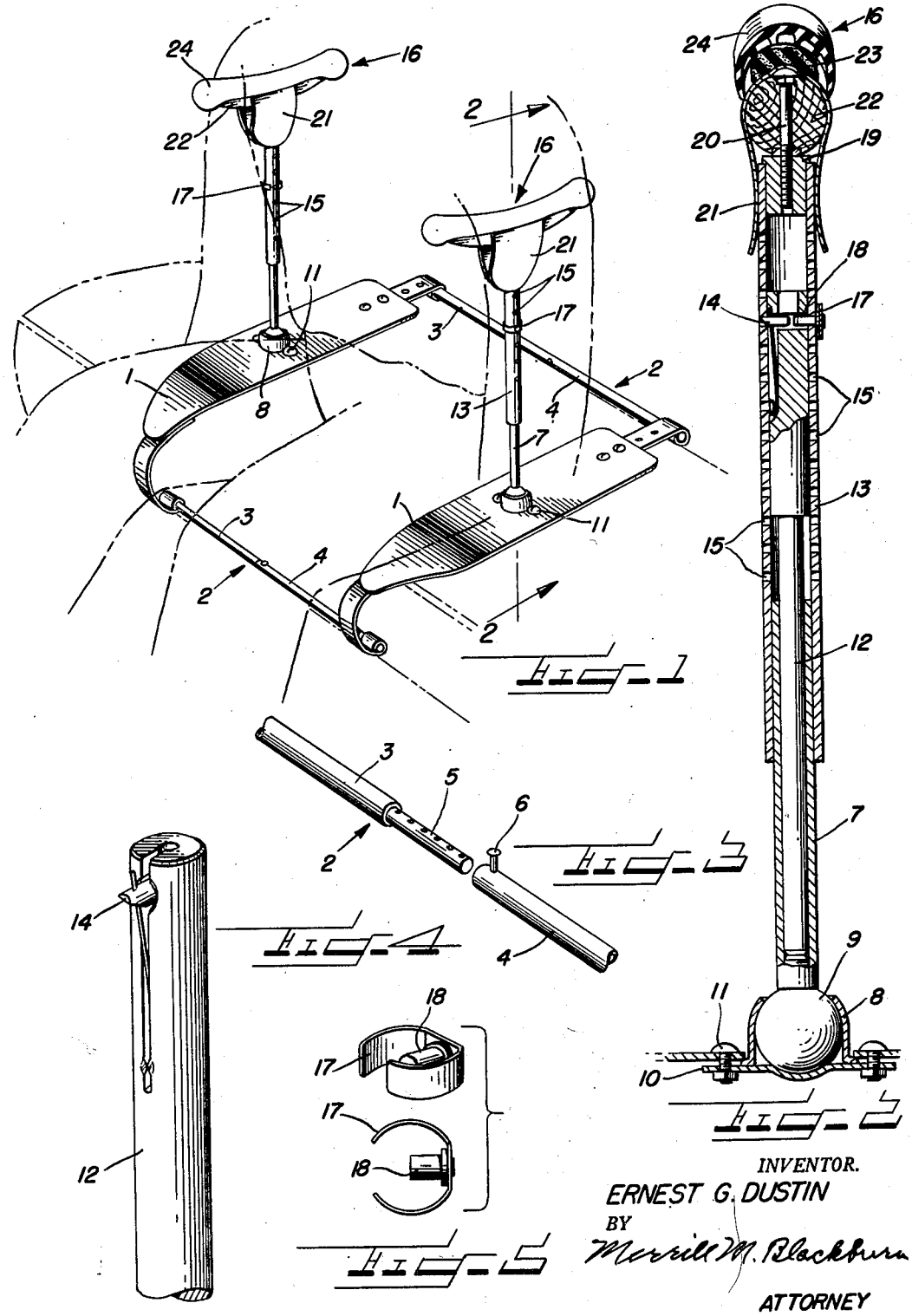

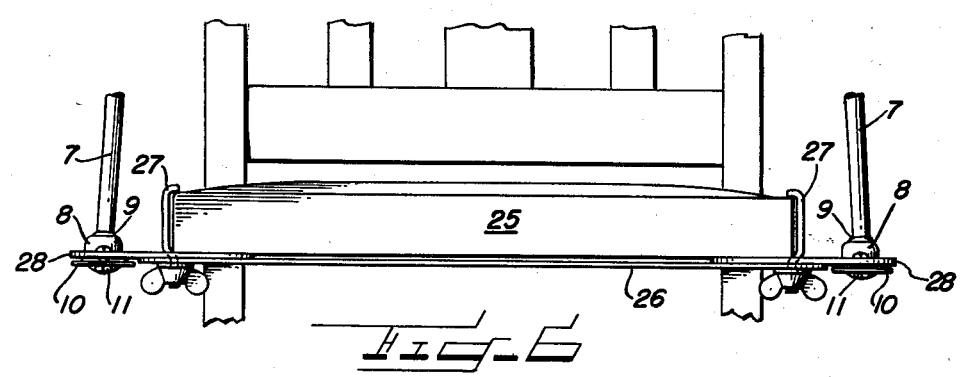
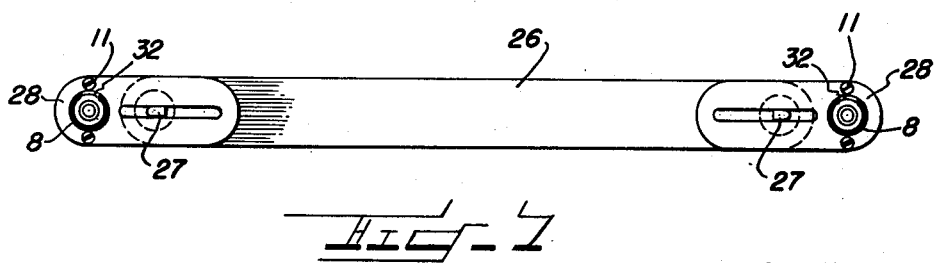
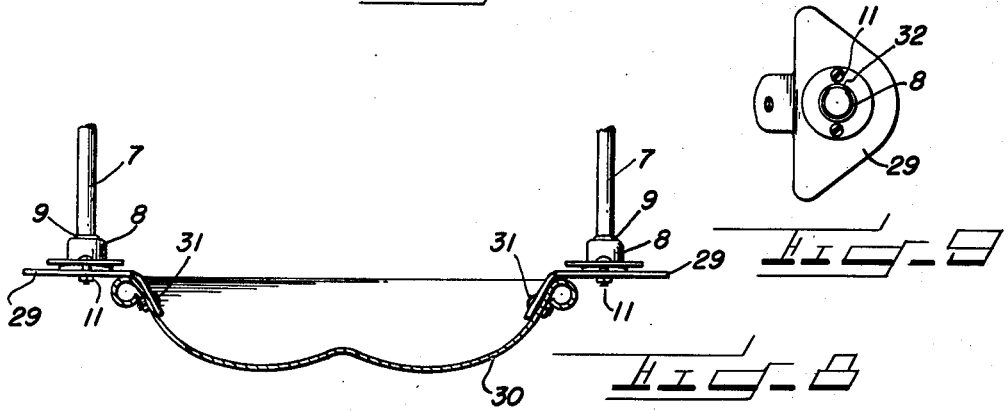
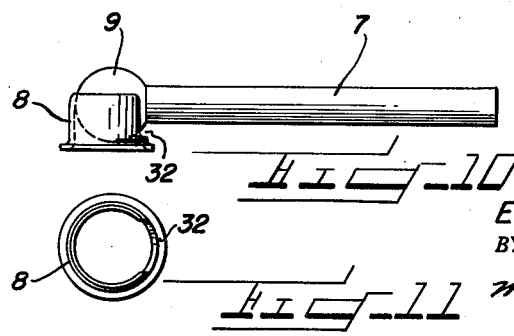
INVENTOR.
ERNEST G. DUSTIN
BY
Merrill M. Blackburn
ATTORNEY Patented Feb. 2, 1954

UNITED STATES PATENT OFFICE 2,667,913

BODY SUPPORT AND WEIGHT DISTRIBUTOR

Ernest G. Dustin, near Galva, Ill.

Application October 13, 1951, Serial No. 251,193

3 Claims. (Cl. 155—188)

My present invention relates to means for supporting a portion of the weight of the upper part of the human body, other than by means of the spinal column. Primarily, the structure of this invention is for the use of those driving motor vehicles, and particularly those who have to make long drives, although it is also useful to persons who, because of sickness or weakness from other causes, find it difficult or painful to support the body in an erect position. Among the objects of this invention are the provision of an apparatus which can be utilized to support a part of the weight of the upper portion of the human body by means of more or less rigid props engaging under the arms of the user, the provision of an apparatus of the type indicated which can be moved, readily, to various positions to accommodate the shifting of the body; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, together with modifications thereof, I desire the same to be understood as illustrative only and not to be interpreted in a limiting sense.

In the drawings annexed hereto and forming a part hereof,

Fig. 1 shows one means of supporting the body supports;

Fig. 2 represents a section substantially along the plane indicated by the line 2—2 in Fig. 1;

Fig. 3 is a detached, expanded view of a part of Fig. 1;

Fig. 4 is a detached, enlarged view of a part of Fig. 2;

Fig. 5 is a detached, enlarged view of a part of Fig. 2, shown in two positions;

Fig. 6 shows a modified form of support for the body supports;

Fig. 7 is a plan view of the structure shown in Fig. 6;

Fig. 8 shows another form of support suitable for attachment to a tractor seat;

Fig. 9 is a plan view of one of the supports shown in Fig. 8;

Fig. 10 is a detached view of a portion of the structure shown in Figs. 1, 2, and 6 to 8; and Fig. 11 is a plan view of a part of the structure shown in Fig. 10.

Reference will now be made in greater detail to the annexed drawings for a more complete description of this invention which, essentially, comprises an approximately flat framework and a pair of upstanding supports.

Attention is first called to the structure shown on Sheet 1 of the drawings. In Fig. 1, a pair of plates 1 are fastened together at the front and rear by extensible connections 2, each made up of a pair of units 3 and 4, connected by a rod 5. A pin 6 passes through holes in the rod 5 and also in the tubular member 4. This arrangement permits the structure to be adjusted in width. This structure can be used on a cushion, or a short cushion can be placed between the tubular members or supports 7 and rest on the plates 1.

The extensible connection 2 fits down behind the cushion or the seat of the vehicle and holds the structure from sliding relatively to the seat. The front structure also helps to hold the frame from sliding.

The bottom section of the tubular member or support 7 fits in the socket 8 and is provided with a ball which enables the tubular member or support 7 to turn in various directions. The socket 8 is provided with a flange which fits beneath the plate 1 and is held in place by a plate 10. The socket 8 and the plate 10 are held together by bolts 11. A rod 12 is adjustable with relation to the tubular member 13 and enables the user to adjust the height of the support to his individual needs. Because of the spring-actuated dogs 14 and the holes 15, it is possible to adjust the length of the supports. The bottom of the rod 12 rests on the bottom of the tubular member 7 and holds the arm rest 16 at the desired height.

The structure shown in Fig. 5 may be used in place of the dogs 14 or in addition to the dogs. The spring 17 fits closely around the tubular member 13 and has a pin 18 which fits in a hole opposite that into which a dog 14 fits. This prevents the dog from being inadvertently withdrawn from the hole.

The tubular member 13 has a head secured to its top by a plug 19 which is preferably secured in place by welding or other suitable means. This plug 19 has an arm or body rest 22 secured thereto by a bolt 20, and a saddle 21 is doubled over the arm or body rest to prevent any possibility of the rest being uncomfortable to the user. To make it even more comfortable, a pad of sponge rubber 23 rests on the saddle, and it is covered by a pad 24 of rubber, corrugated on its inside. If the user finds the arm rests are too high or too low, he can adjust the length of the tubular member 13 until the arm rests hold the major part of his weight so that only a small fraction of his weight is held by his spinal column.

In Fig. 6 is shown the type of support which can be used on a chair, instead of in an automobile or on a tractor seat. The chain seat 25 can be used to support the uprights. A plate 26 has slots formed in its ends through which securing members 27 extend. Extensions 28 also have slots formed therein whereby the extensions can be adjusted laterally to increase or decrease the distance between the supports 7. With the major part of the weight of the body thus lifted from the spinal column by such a structure as described, one can sit comfortably at home, for long stretches of time, busily working with one's hands, yet free from pain and fatigue.

One type of tractor seat is shown at 30 in Fig. 8, and to this is secured an attachment 29 by a bolt 31. To this attachment is secured a socket 3. This socket, in all the forms, is cut down on one side, as shown at 32, so that the support 7 may be lowered without any interference for a person sitting down.

It will be seen that, by reason of this body-weight distributor, the weight of the body is not all borne by the spinal column but is largely borne by the under arms, and that this amount can be adjusted according to the desires of the user. My work has necessitated my doing a great deal of driving but, while doing it, I have cured myself of what had been pronounced by doctors as incurable arthritis. My legs and back had become stiff, but they have been completely limbered up by thus taking the most of the weight of the body off of the spinal column while driving many thousands of miles with these supports under my arms.

It is of course understood that the specific description of structure set forth above may be departed from without departing from the spirit of this invention as disclosed in this specification and as defined by the appended claims.

Having now described my invention, I claim:

1. A body support comprising plate means to rest on a seat, socket means attached to said plate means, said socket means having uprights supported thereby, said uprights having balls at the lower ends thereof whereby the uprights may be inclined, the rear sides of the sockets having slots cut therein which permit the uprights to be tilted backwardly, said uprights comprising a tubular bottom portion, a tubular upper portion, and an inner portion provided with means for adjusting the height to the tubular upper portion.

2. A support for the human body comprising a plate and an upright supported thereon, a socket supported by the plate, said upright having a ball at its lower end connecting the plate and the upright by a ball and socket joint whereby to permit universal movement of the upright, the upright comprising a plurality of parts, the upper and lower parts being tubular, the upper part having holes therein, the third part being a rod and having a spring-actuated dog for engaging in the holes of the upright, and a pad for engaging under at least one of the arms of the user.

3. An adjustable body support comprising a tubular member having pairs of oppositely arranged holes, a rod slidable lengthwise of the tubular member, a spring-pressed dog in the upper end of the rod engageable in one of the holes in the tubular member to adjust the height thereof, a roughly ring-shaped spring surrounding the tubular member, and a pin carried by the central part of the ring-shaped spring and extending into the hole opposite the dog to prevent the same from being inadvertently withdrawn from the hole.

ERNEST G. DUSTIN.

References Cited in the file of this patent

UNITED STATES PATENTS

| Number | Name | Date |
|---|---|---|
| 1,255,539 | Kuderer | Feb. 5, 1918 |
| 1,732,763 | McKeag | Oct. 22, 1929 |
| 2,168,976 | Clarke | Aug. 8, 1939 |
| 2,484,401 | Coie | Oct. 11, 1949 |